(12) United States Patent
Lu et al.

(10) Patent No.: US 11,934,371 B2
(45) Date of Patent: Mar. 19, 2024

(54) DATA PROCESSING METHOD AND APPARATUS, AND COMPUTER-READABLE STORAGE MEDIUM

(71) Applicant: NETSUNION CLEARING CORPORATION, Beijing (CN)

(72) Inventors: Xiang Lu, Beijing (CN); Jianjiang Xu, Beijing (CN); Yantao Gao, Beijing (CN); Wenbin Nie, Beijing (CN); Qin Huang, Beijing (CN); Yu Yang, Beijing (CN); Qiang Zhang, Beijing (CN); Lei Fan, Beijing (CN); Chao Zuo, Beijing (CN)

(73) Assignee: NETSUNION CLEARING CORPORATION, Beijing (CN)

( * ) Notice: Subject to any disclaimer, the term of this patent is extended or adjusted under 35 U.S.C. 154(b) by 241 days.

(21) Appl. No.: 17/051,986

(22) PCT Filed: May 13, 2019

(86) PCT No.: PCT/CN2019/086691
§ 371 (c)(1),
(2) Date: Oct. 30, 2020

(87) PCT Pub. No.: WO2019/218976
PCT Pub. Date: Nov. 21, 2019

(65) Prior Publication Data
US 2021/0232561 A1   Jul. 29, 2021

(30) Foreign Application Priority Data

May 14, 2018 (CN) .......................... 201810455294.5

(51) Int. Cl.
*G06F 16/20* (2019.01)
*G06F 16/22* (2019.01)
*G06F 16/23* (2019.01)

(52) U.S. Cl.
CPC ........ *G06F 16/2282* (2019.01); *G06F 16/235* (2019.01); *G06F 16/2358* (2019.01); *G06F 16/2365* (2019.01)

(58) Field of Classification Search
CPC .............. G06F 16/2282; G06F 16/235; G06F 16/2358; G06F 16/2365
See application file for complete search history.

(56) References Cited

U.S. PATENT DOCUMENTS

| 2014/0101646 A1* | 4/2014 | Buzaski ............. G06F 16/2365 717/168 |
| 2017/0031818 A1* | 2/2017 | van Rotterdam ......... G06F 8/41 |
| 2017/0308470 A1* | 10/2017 | Bagal ................. G06F 12/0897 |

FOREIGN PATENT DOCUMENTS

| CN | 101625686 A | 1/2010 |
| CN | 101980187 A | 2/2011 |

(Continued)

OTHER PUBLICATIONS

Hu Wuyang, "Office Action for CN Application No. 201810455294.5", dated Oct. 10, 2020, CNIPA, China.

(Continued)

*Primary Examiner* — Belix M Ortiz Ditren
(74) *Attorney, Agent, or Firm* — Bridgeway IP Law Group, PLLC; Jihun Kim

(57) ABSTRACT

A data processing method includes: generating a service serial number for a target service according to a preset naming rule; obtaining service data of the target service; obtaining a target data table from a plurality of pre-configured data tables, according to the service serial number; and storing the service data to the target data table.

12 Claims, 4 Drawing Sheets

(56) References Cited

FOREIGN PATENT DOCUMENTS

| | | |
|---|---|---|
| CN | 102158373 A | 8/2011 |
| CN | 104636499 A | 5/2015 |
| CN | 106878367 A | 6/2017 |
| CN | 107463693 A | 12/2017 |
| JP | H10289134 A | 10/1998 |
| JP | 2003006007 A | 1/2003 |
| JP | 2006350408 A | 12/2006 |
| WO | 2016101621 A1 | 6/2016 |

OTHER PUBLICATIONS

Yavor Boyadzhiev, "Search Report for EP Application No. 19804260.8", dated Jan. 5, 2022, EPO, Germany.

Ryotaro Iwahashi, "Office Action for JP Application No. 2020-558513", dated Nov. 20, 2021, JPO, Japan.

* cited by examiner

DATA PROCESSING METHOD AND APPARATUS, AND COMPUTER-READABLE STORAGE MEDIUM

CROSS-REFERENCE TO RELATED APPLICATION(S)

This disclosure is a U.S. national phase application of PCT/CN2019/086691 filed on May 13, 2019, which claims priority to Chinese Patent Application No. 201810455294.5 filed on May 14, 2018.

TECHNICAL FIELD

The disclosure relates to the field of data processing technologies, and more particularly, to a data processing method, a data processing apparatus, and a computer-readable storage medium.

BACKGROUND

With the continuous development of information technologies, there are increasing service types, and service data volumes are growing rapidly. Taking transactions through online banking service as examples, it needs to record service data such as source, destination, transaction purpose, and transaction amount of each transaction, such that the service data has characteristics of high real-time and large data volume, which brings difficulties for storing the service data.

Currently, when storing the service data, the generated service data is generally stored in a unified data table. In this way, when the service data volume is growing, read and write response speed of the data table for storing the service data decreases, which affects storage performance. Therefore, how to improve storage efficiency of the service data while ensuring the read and write response speed of the data table has become an urgent problem to be solved.

SUMMARY

Embodiments of a first aspect of the disclosure provide a data processing method. The method includes: generating a service serial number for a target service according to a preset naming rule; obtaining service data of the target service; obtaining a target data table from a plurality of pre-configured data tables, according to the service serial number; and storing the service data to the target data table.

Embodiments of a second aspect of the disclosure provide a data processing apparatus. The apparatus includes: a processor; and a non-transitory computer-readable storage medium storing a plurality of instructions that, when executed by the processor, cause the data processing apparatus to: generate a service serial number for a target service according to a preset naming rule; obtain service data of the target service; obtain a target data table from a plurality of pre-configured data tables, according to the service serial number; store the service data to the target data table.

Embodiments of a third aspect of the disclosure provide a non-transitory computer-readable storage medium having a computer program stored thereon, in which when the computer program is executed by a processor, the data processing method according to the embodiments of the first aspect is implemented.

Additional aspects and advantages of the disclosure will be given in part in the following descriptions, become apparent in part from the following descriptions, or be learned from the practice of the disclosure.

BRIEF DESCRIPTION OF THE DRAWINGS

The above and/or additional aspects and advantages of the disclosure will become apparent and more readily appreciated from the following descriptions of the embodiments made with reference to the drawings, in which.

DETAILED DESCRIPTION

Figure 1:
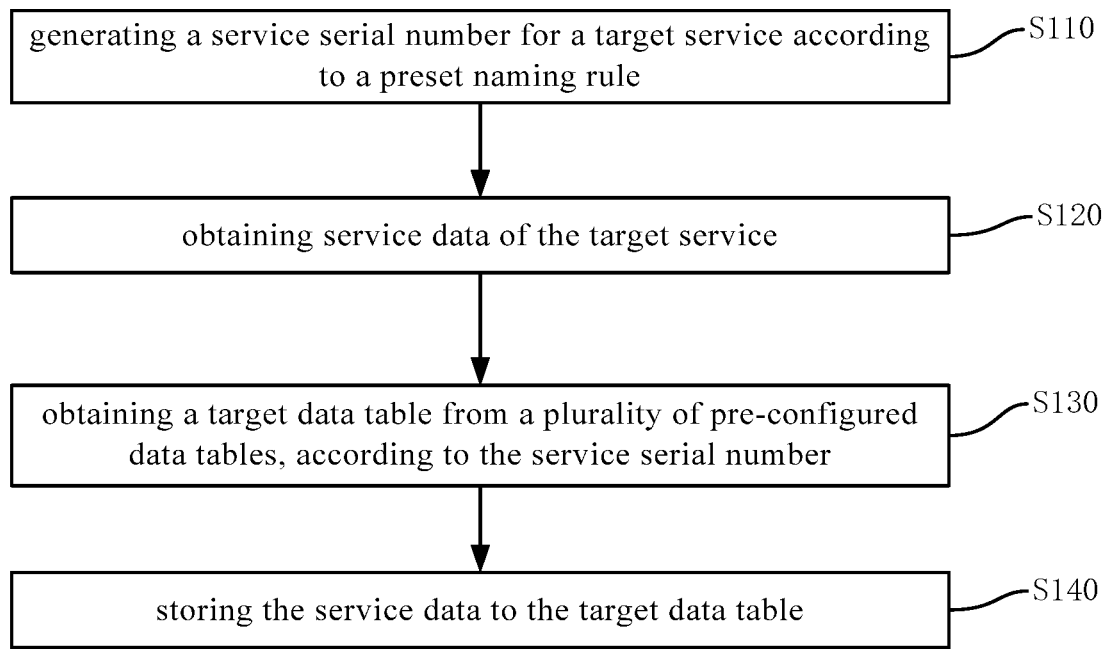
FIG. 1 is a flowchart of a data processing method according to an embodiment of the disclosure.

Embodiments of the disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the disclosure, and are not construed to limit the disclosure.

A data processing method, a data processing apparatus, and a computer-readable storage medium according to the embodiments of the disclosure may be described below with reference to the accompanying drawings.

FIG. 1 is a flowchart of a data processing method according to an embodiment of the disclosure. It should be noted that the data processing method according to embodiments of the disclosure is applicable to the data processing apparatus according to embodiments of the disclosure. For example, the data processing method according to embodiments of the disclosure is applicable to an online banking transaction system.

As illustrated in FIG. 1, the data processing method may include the following.

At block S110, a service serial number for a target service is generated according to a preset naming rule.

It is understood that service data of various services are generated with the operation of the online banking transaction system, and the data processing method according to the embodiments of the disclosure is capable of processing the service data for those various services. Storage locations (i.e., corresponding databases) of the service data generated by services with different service types may vary with the service types. Therefore, for the convenience of description, the embodiments of the disclosure are described below by taking the target service as an example.

Alternatively, when it is detected that a user employs the target service and the service data of the target service is generated, the service serial number for the target service is generated according to the preset naming rule. The service serial number is understood as a unique identifier of the target service.

It should be noted that, in an embodiment of the disclosure, the above-mentioned service serial number may have two portions. One portion is random numbers generated randomly. Another portion is a number set containing database index information, date information, and table index information. The aforementioned random numbers may also include a number indicating uniqueness of the service and a number indicating the service type to which the service belongs.

For example, taking the service serial number having 14 digits as an example, according to the preset naming rule, a random number composed of 8 digits is generated, in which the random number is required to contain a number indicating uniqueness of the current service and a number indicating the service type to which the service belongs, for example, the generated random number is "01234567", in which "0" indicates the service type to which the service belongs, and "1234567" indicates the uniqueness of the current service. According to the preset naming rule, another number set is generated, which contains database index information, date information, and table index information. For example, a number set "052301" is generated, in which "05" represents the database index information, that is, the fifth database, "23" represents the date information, that is, the $23^{rd}$ day of each month, and "01" represents the table index information, that is, the first data table generated at the $23^{rd}$ day. In this way, the service serial number of the target service generated according to the aforementioned preset naming rule is "01234567052301".

It should be noted that the embodiments of the disclosure do not specifically limit the number of digits included in the above-mentioned service serial number, which is defined according to actual requirements.

At block S120, service data of the target service is obtained.

Alternatively, when it is detected that the target service is completed, the service data of the target service is obtained. For example, taking an online banking transaction as an example, when it is detected that the transaction is completed, transaction data of the transaction, such as the source, destination, purpose of the transaction, and transaction amount, is obtained.

At block S130, a target data table is obtained from a plurality of pre-configured data tables, according to the service serial number.

It should be noted that in the embodiments of the disclosure, N data tables are pre-configured, and the N data tables are allocated to M databases respectively, and each database is divided into different portions according to the number of days in each month. Each portion may include L data tables, where N=M*the number of portions*L, and N, M, and L are all positive integers.

Alternatively, in embodiments of the disclosure, the date information, the database index information of the corresponding target database, and the table index information of the target data table are extracted from the service serial number according to the preset naming rule. The corresponding target database is determined according to the database index information, and the target data table is obtained from the data tables in the corresponding target database according to the date information and the table index information.

That is, when the service serial number of the target service is obtained, the number indicating the date, the number indicating the database index information, and the number indicating the table index information are extracted from the service serial number according to the preset naming rule. The corresponding target database is found according to the number indicating the database index information, and the data tables stored at the data are found from the target database according to the number indicating the date, and according to the number indicating the table index information, the target data table is selected from the data tables at the date.

For example, taking the service serial number "01234567052301" as an example, according to the preset naming rule, the number "23" indicating the date, the number "05" indicating the database index information, and the number "01" indicating the table index information are extracted from the service serial number. The corresponding target database (i.e., the fifth database) is found according to the number "05" indicating the database index information, and according to the number "23" indicating the date, the data tables stored at the date (that is, the $23^{rd}$ of the month) are selected from the target database, and according to the number "01" indicating the table index information, the target data table (i.e., the first data table stored at the $23^{rd}$ day of the month) is selected from the data tables stored at the date.

At block S140, the service data is stored to the target data table.

In detail, after obtaining the location where the service data of the target service is to be stored (that is, after the target data table is found), the service data is stored in the target data table.

Alternatively, in embodiments of the disclosure, table name information of each pre-configured data table includes: the database index information of the database, the date information, and the table index information of the data table. That is, the table name information includes the database index, date, and table index of the database, to distinguish which database does each service fall into, which day's data table in the database, and which data table belongs to that day. For example, assuming that the table name of a certain data table is "trans_05.table_23_01", this table name means the fifth database of trans, tables on the $23^{rd}$ day of each month in this database, and the first data table stored at that day. It is understood that the service data corresponding to the service serial number such as "XXXXXXXX052301" is stored in the data table named "trans_05.table_23_01".

Figure 2:
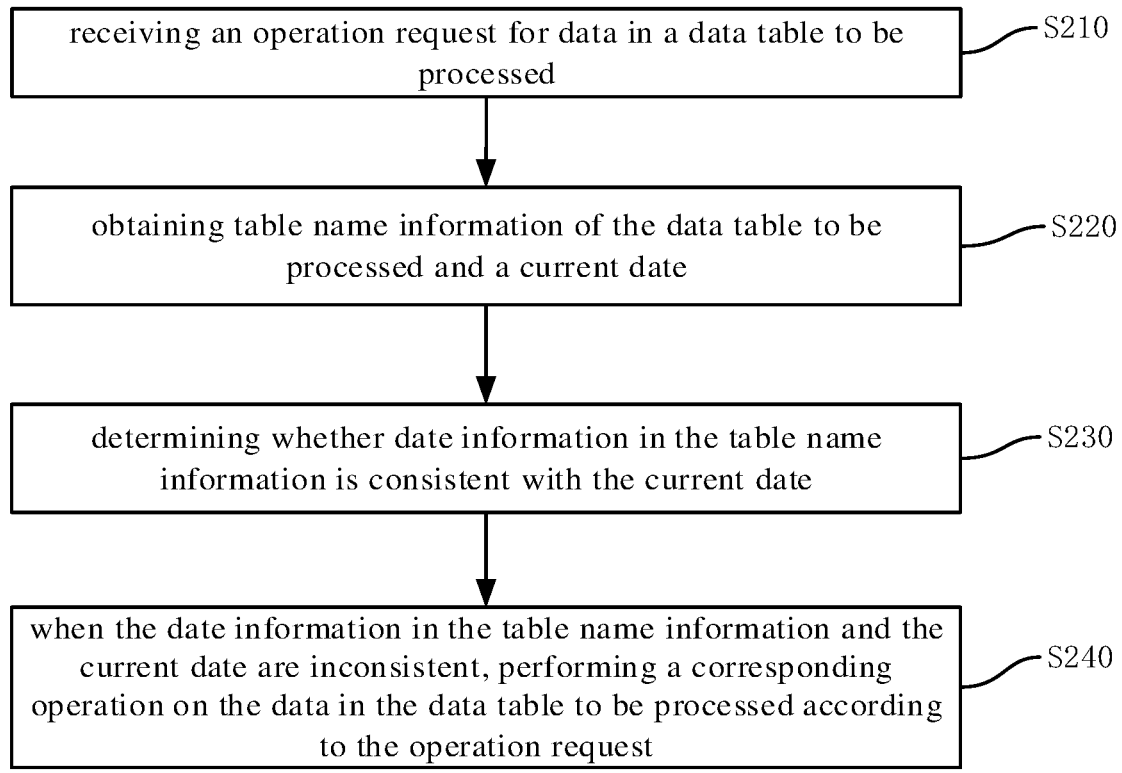
FIG. 2 is a flowchart of a data processing method according to another embodiment of the disclosure.

In the embodiments of the disclosure, as illustrated in FIG. 2, the data processing method may further include the following.

At block 210, an operation request for data in a data table to be processed is received. Alternatively, during processing the service data, the operation request for the data in the data table to be processed, sent by the user, is received. In an embodiment of the disclosure, the operation request may include, but is not limited to, a deletion request, a replacement request, a modification request and an addition request. For example, when the user wants to clear a certain data table, the deletion request is performed on all the service data in the data table.

At block 220, table name information of the data table to be processed and a current date are obtained.

Alternatively, upon receiving the operation request for the data in the table to be processed from the user, the table name information of the data table is obtained, the number indicating the date is obtained from the table name information, and the current date (i.e., that very day) is obtained. In the embodiments of the disclosure, the date is understood as the day of each month, that is, the date is in days.

At block 230, it is determined whether the date information in the table name information is consistent with the current date.

For example, if the date information in the table name information is "23" and the current date is the $23^{rd}$, it is determined that the date information in the table name information is consistent with the current date. Since the data table of the day provides read and write services, at this time, the data table of the day could not be cleared, and the user's operation is ignored, and error information is fed back to the user to remind the user that the data table to be processed is currently being used and could not be cleared.

At block 240, when the date information in the table name information and the current date are inconsistent, a corresponding operation is performed on the data in the data table to be processed according to the operation request.

Alternatively, when the date information in the table name information is determined to be inconsistent with the current date, the corresponding operation is performed on the data in the data table to be processed according to the operation request. That is, when it is determined that the date information in the table name information is inconsistent with the current date, it is understood that the data table to be processed does not currently provide read and write services and is in an offline state. At this time, the corresponding operation is performed on the data in the data table to be processed according to the operation request, that is, any maintenance operation could be performed on the data table to be processed. In this way, the purpose of offline operation and maintenance of the data table is achieved.

With the data processing method of the embodiments of the disclosure, the service serial number for the target service is generated according to the preset naming rule, and the service data of the target service is obtained. The target data table is selected from the plurality of pre-configured data tables, according to the service serial number, and the service data is stored in the target data table. That is, the data tables are pre-configured and named according to the preset naming rule. In this way, in practical applications, the service serial number of the target service is generated according to the preset naming rule, and then according to the service serial number, the target data table is selected from the data tables, such that the service data of the target service is stored in the target data table. Therefore, in the design of database storage, space is traded for efficiency, and the storage is divided into a plurality of databases and tables, thereby improving the concurrency of writing or reading (for example, a plurality of databases and tables provide read and write services simultaneously) and the data storage efficiency while ensuring the read and write response speed of the data table.

Figure 3:
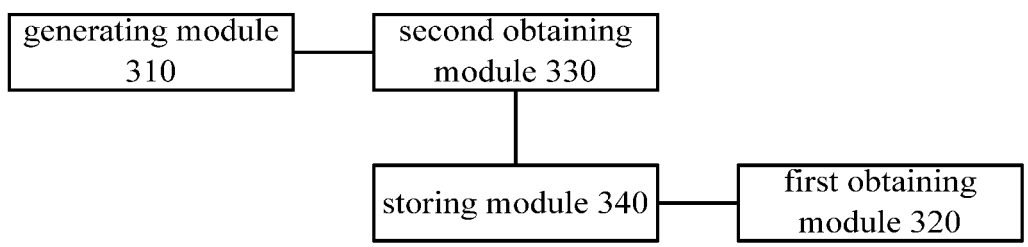
FIG. 3 is a block diagram of a data processing apparatus according to an embodiment of the disclosure.

In embodiments of the disclosure, a data processing apparatus corresponding to the data processing method according to the foregoing embodiments may be provided. Since the data processing apparatus according to the embodiments of the disclosure corresponds to the data processing method according to the foregoing embodiments, the foregoing implementation of the data processing method is also applicable to the data processing apparatus according to the embodiments, which will not be described in detail in the embodiments. FIG. 3 is a block diagram of a data processing apparatus according to an embodiment of the disclosure. As illustrated in FIG. 3, the data processing apparatus includes: a generating module 310, a first obtaining module 320, a second obtaining module 330 and a storing module 340.

The generating module 310 is configured to generate a service serial number for a target service according to a preset naming rule.

The first obtaining module 320 is configured to obtain service data of the target service.

Figure 4:
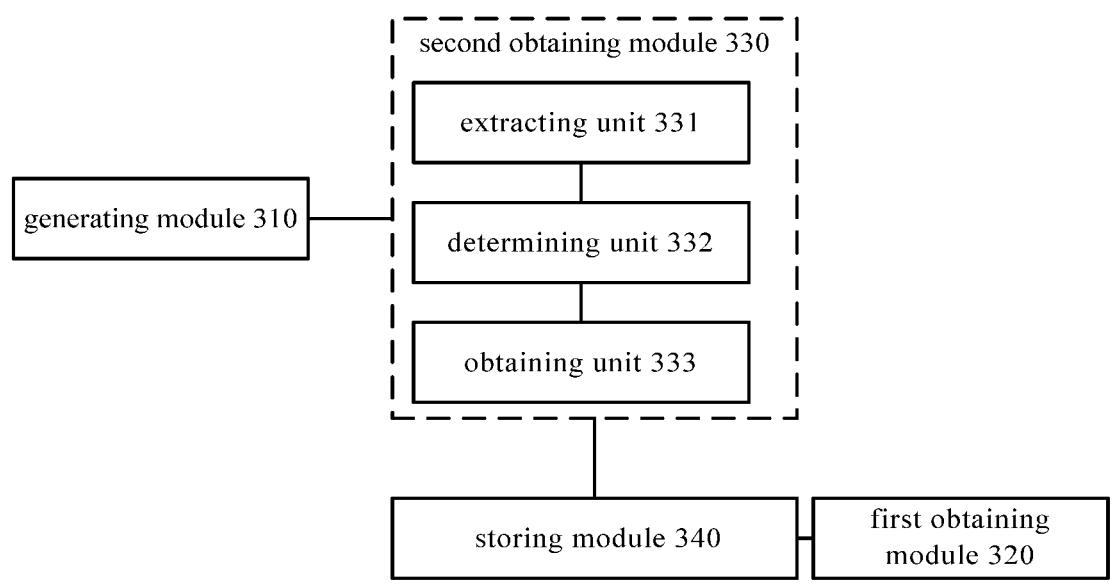
FIG. 4 is a block diagram of a data processing apparatus according to a specific embodiment of the disclosure.

The second obtaining module 330 is configured to obtain a target data table from a plurality of pre-configured data tables, according to the service serial number. As an example, as illustrated in FIG. 4, the second obtaining module 330 may include: an extracting unit 331, a determining unit 332, and an obtaining unit 333.

The extracting unit 331 is configured to extract date information, database index information of a corresponding target database, and table index information of the target data table from the service serial number according to the preset naming rule. The determining unit 332 is configured to determine the corresponding target database according to the database index information. The obtaining unit 333 is configured to obtain the target data table from a plurality of data tables in the corresponding target database, according to the date information and the table index information.

The storing module 340 is configured to store the service data to the target data table.

Alternatively, in an embodiment of the disclosure, table name information of each pre-configured data table includes: the database index information of the database, the date information, and the table index information of the data table. That is, the table name information includes database index, date, and table index of the database, to distinguish which database does each service fall into, which day's data table in the database, and which data table belongs to that day. For example, assuming that the table name of a certain data table is "trans_05.table_23_01", this table name means the fifth database of trans, tables on the $23^{rd}$ day of each month in this database, and the first data table stored at that day. It is understood that the service data corresponding to the service serial number such as "XXXXXXXX052301" is stored in the data table named "trans_05.table_23_01".

Figure 5:
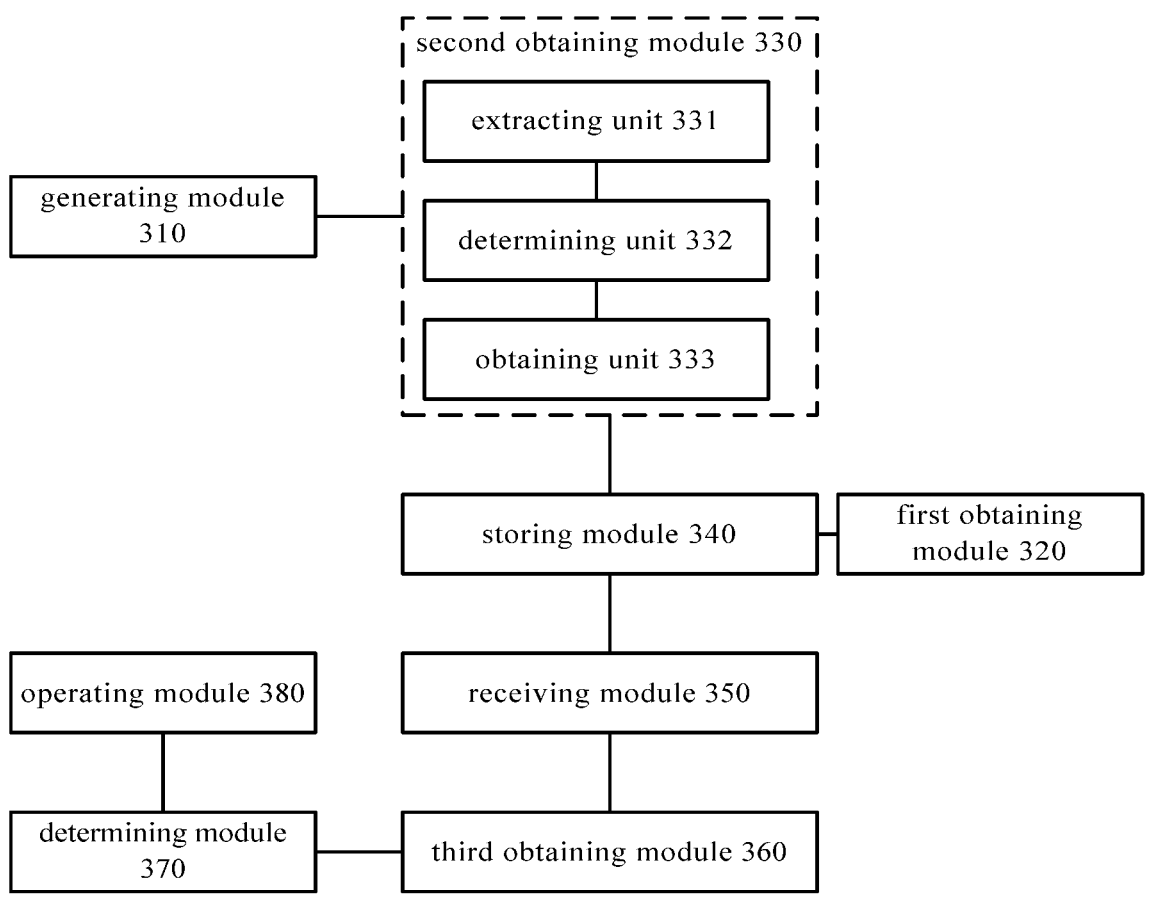
FIG. 5 is a block diagram of a data processing apparatus according to another specific embodiment of the disclosure.

In the embodiments of the disclosure, as illustrated in FIG. 5, the data processing apparatus may further include: a receiving module 350, a third obtaining module 360, a determining module 370 and an operating module 380. The receiving module 350 is configured to receive an operation request for data in a data table to be processed. The third obtaining module 360 is configured to obtain table name information of the data table to be processed and a current date. The determining module 370 is configured to determine whether date information in the table name information is consistent with the current date. The operating module 380 is configured to, when the date information in the table name information and the current date are inconsistent, perform a corresponding operation on the data in the data table to be processed according to the operation request. In this way, the purpose of offline operation and maintenance of the data tables is achieved.

With the data processing apparatus of the embodiments of the disclosure, the data tables are pre-configured and named according to the preset naming rule. In this way, in practical applications, the service serial number of the target service is generated according to the preset naming rule, and then according to the service serial number, the target data table is selected from the data tables, such that the service data of the target service is stored in the target data table. Therefore, in the design of database storage, space is traded for efficiency, and the storage is divided into a plurality of databases and tables, thereby improving the concurrency of writing or reading (for example, a plurality of databases and tables provide read and write services simultaneously) and the data storage efficiency while ensuring the read and write response speed of the data table.

In order to implement the above embodiments, the disclosure further provides a non-transitory computer-readable storage medium having a computer program stored thereon, in which when the computer program is executed by a processor, the data processing method according to embodiment of the first aspect is implemented.

Reference throughout this specification to "an embodiment," "some embodiments," "an example," "a specific example," or "some examples," means that a particular feature, structure, material, or characteristic described in connection with the embodiment or example is included in at least one embodiment or example of the disclosure. The appearances of the above phrases in various places throughout this specification are not necessarily referring to the same embodiment or example of the disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Any process or method described in a flow chart or described herein in other ways may be understood to include one or more modules, segments or portions of codes of executable instructions for achieving specific logical functions or steps in the process, and the scope of a preferred embodiment of the disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the disclosure, and changes, alternatives, and modifications can be made in the embodiments without departing from scope of the disclosure.

What is claimed is:

1. A data processing method, comprising:
generating a service serial number for a target service according to a preset naming rule, wherein the service serial number comprises two portions, one of the two portions comprises random numbers generated randomly, another of the two portions comprises a number set including database index information, date information, and table index information, and the random numbers generated randomly comprises numbers indicating uniqueness of the target service and a number indicating a service type to which the target service belongs;
obtaining a target database from M databases according to the database index information;
obtaining a portion from the target database according to the date information, wherein the number of portions in the target database relates to a number of days in each month and each portion comprises L target data tables;
obtaining a target data table from the L target data tables of the portion according to the table index information, wherein there are N data tables in the M databases, N=M*the number of portions*L, and N, M, and L are all positive integers;
obtaining service data of the target service; and
storing the service data to the target data table.

2. The data processing method according to claim 1, further comprising:
receiving an operation request for data in a data table to be processed;
obtaining table name information of the data table to be processed and a current date;
determining whether date information in the table name information is consistent with the current date; and when the date information in the table name information and the current date are inconsistent, performing a corresponding operation on the data in the data table to be processed according to the operation request.

3. The data processing method according to claim 2, wherein the operation request comprises a deletion request, a replacement request, a modification request, and an addition request.

4. A data processing apparatus, comprising:
a processor; and
a non-transitory computer-readable storage medium storing a plurality of instructions that, when executed by the processor, cause the data processing apparatus to:
generate a service serial number for a target service according to a preset naming rule, wherein the service serial number comprises two portions, one of the two portions comprises random numbers generated randomly, another of the two portions comprises a number set including database index information, date information, and table index information, and the random numbers generated randomly comprises numbers indicating uniqueness of the target service and a number indicating a service type to which the target service belongs;
obtain a target database from M databases according to the database index information;
obtain a portion from the target database according to the date information, wherein the number of portions in the target database relates to a number of days in each month and each portion comprises L target data tables;
obtain a target data table from the L target data tables of the portion according to the table index information, wherein there are N data tables in the M databases, N=M*the number of portions*L, and N, M, and L are all positive integers;
obtain service data of the target service; and
store the service data to the target data table.

5. The data processing apparatus according to claim 4, wherein the plurality of instructions, when executed by the processor, further cause the data processing apparatus to:
receive an operation request for data in a data table to be processed;
obtain table name information of the data table to be processed and a current date;
determine whether date information in the table name information is consistent with the current date; and
when the date information in the table name information and the current date are inconsistent, perform a corresponding operation on the data in the data table to be processed according to the operation request.

6. The data processing apparatus according to claim 5, wherein the operation request comprises a deletion request, a replacement request, a modification request, and an addition request.

7. A non-transitory computer-readable storage medium having a computer program stored thereon, wherein when the program is executed by a processor, a data processing method is implemented, the method comprising:
generating a service serial number for a target service according to a preset naming rule, wherein the service serial number comprises two portions, one of the two portions comprises random numbers generated randomly, another of the two portions comprises a number set including database index information, date information, and table index information, and the random numbers generated randomly comprises numbers indicating uniqueness of the target service and a number indicating a service type to which the target service belongs;
obtaining a target database from M databases according to the database index information;
obtaining a portion from the target database according to the date information, wherein the number of portions in the target database relates to a number of days in each month and each portion comprises L target data tables;
obtaining a target data table from the L target data tables of the portion according to the table index information, wherein there are N data tables in the M databases, N=M*the number of portions*L, and N, M, and L are all positive integers;
obtaining service data of the target service; and
storing the service data to the target data table.

8. The non-transitory computer-readable storage medium according to claim 7, wherein the method further comprises:
receiving an operation request for data in a data table to be processed;
obtaining table name information of the data table to be processed and a current date;
determining whether date information in the table name information is consistent with the current date; and
when the date information in the table name information and the current date are inconsistent, performing a corresponding operation on the data in the data table to be processed according to the operation request.

9. The non-transitory computer-readable storage medium according to claim 8, wherein the operation request comprises a deletion request, a replacement request, a modification request, and an addition request.

10. The data processing method according to claim 2, further comprising:
when the date information in the table name information is consistent with the current date, providing error information and ignoring a corresponding operation on the data in the data table to be processed according to the operation request.

11. The data processing apparatus according to claim 5, wherein the plurality of instructions, when executed by the processor, further cause the data processing apparatus to:
when the date information in the table name information is consistent with the current date, provide error information and ignore a corresponding operation on the data in the data table to be processed according to the operation request.

12. The non-transitory computer-readable storage medium according to claim 8, wherein the method further comprises:
when the date information in the table name information is consistent with the current date, providing error information and ignoring a corresponding operation on the data in the data table to be processed according to the operation request.

* * * * *